United States Patent
Tsutsui

(10) Patent No.: US 8,603,286 B2
(45) Date of Patent: Dec. 10, 2013

(54) MECHANICAL PART AND MANUFACTURING METHOD FOR THE SAME

(75) Inventor: Hideyuki Tsutsui, Kuwana (JP)

(73) Assignee: NTN Corporation, Osaka (JP)

( * ) Notice: Subject to any disclaimer, the term of this patent is extended or adjusted under 35 U.S.C. 154(b) by 264 days.

(21) Appl. No.: 12/997,776

(22) PCT Filed: Jun. 11, 2009

(86) PCT No.: PCT/JP2009/060679
§ 371 (c)(1),
(2), (4) Date: Dec. 13, 2010

(87) PCT Pub. No.: WO2010/004829
PCT Pub. Date: Jan. 14, 2010

(65) Prior Publication Data
US 2011/0095632 A1 Apr. 28, 2011

(30) Foreign Application Priority Data

Jul. 10, 2008 (JP) .................. 2008-180457
Oct. 14, 2008 (JP) .................. 2008-265163

(51) Int. Cl.
*B29C 65/48* (2006.01)

(52) U.S. Cl.
USPC .................. 156/272.2; 384/100; 428/480

(58) Field of Classification Search
USPC .................. 156/272.2; 384/100; 428/480
See application file for complete search history.

(56) References Cited

U.S. PATENT DOCUMENTS

| | | | |
|---|---|---|---|
| 2003/0156773 A1 | 8/2003 | Tsuchiya et al. | |
| 2005/0274018 A1* | 12/2005 | Gomyo et al. | 29/898.02 |
| 2007/0237438 A1 | 10/2007 | Ito | |

FOREIGN PATENT DOCUMENTS

| | | |
|---|---|---|
| EP | 1 335 143 A2 | 8/2003 |
| JP | 1-197588 A | 8/1989 |
| JP | 5-124255 A | 5/1993 |
| JP | 6-192625 A | 7/1994 |
| JP | 2005-188552 A | 7/2005 |
| JP | 2005-282770 A | 10/2005 |
| JP | 2005-344793 A | 12/2005 |
| JP | 2007-265687 A | 10/2007 |
| WO | 2005/1061913 A1 | 7/2005 |

OTHER PUBLICATIONS

"IR cut-off filter", http://www.optics-online.com/irc.asp, accessed Feb. 21, 2013.*

(Continued)

*Primary Examiner* — Richard Crispino
*Assistant Examiner* — Elizabeth Royston
(74) *Attorney, Agent, or Firm* — Westerman, Hattori, Daniels & Adrian, LLP

(57) ABSTRACT

Reliability of a mechanical part including two parts fixed to each other by an anaerobic adhesive is improved, at least one of the two parts being made of a resin material. After UV treatment is performed on an adhesive surface (10) with respect to a bracket (6) of an outer peripheral surface (7a1) of a housing (7) made of the resin material, the housing (7) is fixed to the bracket (6) by the anaerobic adhesive, whereby an adhesive strength per unit area of 8 N/mm² or more is obtained for both parts. The UV treatment is performed by irradiating an electromagnetic wave, of an electromagnetic wave irradiated from a light source (11), transmitted through an infrared cut filter (12) having a transmittance of 50% or more and 80% or less in an electromagnetic wave having a wavelength of 254 nm, onto the adhesive surface (10) of the housing (7).

4 Claims, 4 Drawing Sheets

(56) References Cited

OTHER PUBLICATIONS

"IR filter (typical) transmission values", http://www.optics-online.com/OOL/pics/IRCcurve40.gif, accessed Feb. 21, 2013.*
JP 2005-282770 English machine translation, obtained Feb. 21, 2013.*
Extended European Search Report dated Sep. 3, 2012, issued in corresponding European Patent Application No. 09794276.7.
Notification of Transmittal of Translation of the International Preliminary Report on Patentability (Form PCT/IB/338) of International Application No. PCT/JP2009/060679 mailed Feb. 17, 2011 with Forms PCT/IB/373 and PCT/ISA/237.
International Search Report of PCT/JP2009/060679, mailing date Sep. 15, 2009.

* cited by examiner

Fig. 5

| Filter(※) | | Example 1 | Example 2 | Comparative example 1 | Comparative example 2 |
|---|---|---|---|---|---|
| Part number | | U330 | U330 | — | HA50 |
| Composition | | $P_2O_5$ | $P_2O_5$ | — | A quartz having oxide-based laminating layer formed thereon |
| | | $Al_2O_3$ | $Al_2O_3$ | | |
| | | CaO | CaO | | |
| | | BaO 9.5wt% | BaO 9.5wt% | | |
| | | ZnO 9.5wt% | ZnO 9.5wt% | | |
| | | CoO 1.2wt% | CoO 1.2wt% | | |
| | | NiO 1.1wt% | NiO 1.1wt% | | |
| Transmittance | Wavelength:254nm | 60% | 60% | — | 0% |
| | Wavelength:365nm | 85% | 85% | — | 85% |
| | Wavelength:800nm | 25% | 25% | — | 20% |

(※) All filters are manufactured by HOYA Corporation.

Fig. 6

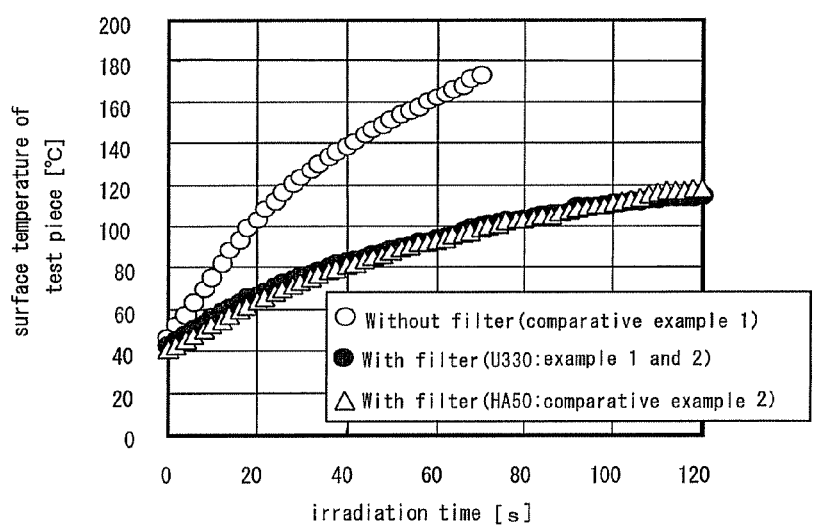

|  |  | Example 1 | Example 2 | Comparative example 1 | Comparative example 2 |
|---|---|---|---|---|---|
| adhesive strength [N/mm²(Mpa)] | Sample No 1 | 18.4 | 8.4 | 2.7 | 3 |
|  | 2 | 19.1 | 9.4 | 3.4 | 4 |
|  | 3 | 19.4 | 9.7 | 5 | 5 |
|  | 4 | 19.8 | 10.1 | 6.7 | 8.4 |
|  | 5 | 20.4 | 11.1 | 8.4 | 9 |
|  | Average | 19.4 | 9.7 | 5.2 | 5.9 |

|  |  | Example 3 | Example 4 | Example 5 | Comparative example 3 | Comparative example 4 |
|---|---|---|---|---|---|---|
| irradiation distance [mm] | | 10 | 10 | 10 | – | 10 |
| irradiation time [s] | | 40 | 100 | 150 | – | 20 |
| accumulated amount of light of 185nm [mJ/cm²] | | 560 | 1400 | 2100 | – | 280 |
| accumulated amount of light of 254nm [mJ/cm²] | | 720 | 1800 | 2700 | – | 360 |
| adhesive stregth [N/mm²(Mpa)] | Sample No 1 | 10.1 | 15.1 | 16.4 | 2.7 | 4 |
|  | 2 | 10.7 | 16.1 | 16.7 | 2.8 | 4.5 |
|  | 3 | 11.7 | 17.4 | 17.4 | 2.9 | 5.9 |
|  | 4 | 12.7 | 18.1 | 18.1 | 3 | 7 |
|  | 5 | 13.4 | 18.4 | 19.4 | 3 | 8.1 |
|  | Average | 11.7 | 17.0 | 17.6 | 2.9 | 5.9 |

MECHANICAL PART AND MANUFACTURING METHOD FOR THE SAME

TECHNICAL FIELD

The present invention relates to a mechanical part and a manufacturing method for the same, and more particularly, to a mechanical part including two parts fixed to each other by an anaerobic adhesive and a manufacturing method for the same, at least one of the two parts being made of a resin material.

BACKGROUND ART

In recent years, for the purpose of a reduction in weight and cost of drive mechanisms or power transmission mechanisms of various types, regarding a mechanical part constituting a component thereof, an attempt has been made to replace a mechanical part made of a metal material (metal part) by one made of a resin material (resin part). As an example of such an attempt, as described in, for example, JP 2005-188552 A (Patent Document 1), there is exemplified a fluid dynamic bearing device in which a housing fixed to a bracket of a spindle motor for a disk drive (HDD or the like) is formed of a resin part. Incidentally, the fluid dynamic bearing device of this type is required to have rotation accuracy of micro order, and hence, upon fixation of the fluid dynamic bearing device (housing) to the bracket, there is such a high risk that desired rotation accuracy can not be satisfied when deformation or distortion occur in each member. Therefore, adhesion, which is unlikely to cause such a problem, is generally adopted as a fixation means for both parts.

[Patent Document 1] JP 2005-188552 A

SUMMARY OF THE INVENTION

Problems to be Solved by the Invention

As an adhesive used for adhesively fixing the both parts, a thermosetting adhesive or an anaerobic adhesive is generally used. Regarding the thermosetting adhesive, a necessarily sufficient adhesive strength can be secured between two parts to be joined, whereas there are problems in that heat treatment for curing is necessary and cost is increased, and that it is difficult to fix the both parts to each other with accuracy within a required level due to a relatively large shrinkage ratio during curing. Therefore, recently, there is such a trend that an anaerobic adhesive, which is unlikely to cause the above-mentioned problems, is suitably used. However, it is difficult to secure the high adhesive strength between the two parts by the anaerobic adhesive, and the mechanical part, which is constituted by the two parts adhered to each other by this adhesive, has a difficulty in reliability. In particular, in a case where at least one of the two parts to be joined is made of a resin material, this problem becomes significant.

The present invention has been made for solving the above-mentioned problems, and a first object of the present invention is therefore to provide a mechanical part including two parts fixed to each other by an anaerobic adhesive, at least one of the two parts being made of a resin material, in which an adhesive strength between the two parts is sufficiently increased and reliability thereof is improved. Further, a second object of the present invention is to provide a method of sufficiently increasing the adhesive strength between the two parts at low cost.

Means for Solving the Problems

A mechanical part according to the present invention, which is made for achieving the first object, includes two parts fixed to each other by an anaerobic adhesive, at least one of the two parts being made of a resin material, and is characterized in that an adhesive strength per unit area of another part with respect to one part is set to 8 $N/mm^2$ or more. Note that, strictly speaking, "the adhesive strength" mentioned herein means "shear bond strength" prescribed in JISK6850 or JISK6852.

In the case where the two parts are fixed to each other with use of a general thermosetting adhesive, at least one of the two parts being made of a resin material, the adhesive strength per unit area between the two parts is set to approximately 8 $N/mm^2$ (=8 MPa). Therefore, as described above, when the adhesive strength per unit area of another part with respect to one part is set to 8 $N/mm^2$ or more, the necessarily sufficient adhesive strength can be secured between the two parts while avoiding the problems concerned in the case of adhesively fixing the two parts by the thermosetting adhesive, and the reliability of the mechanical part of this type is improved.

The above-mentioned configuration can be obtained, for example, by performing UV treatment on an adhesive surface of the resin part (one of the two parts made of a resin material). The adhesive strength of the resin part with respect to the mating part can be increased, for example, by roughing the adhesive surface by an etching (including wet etching such as chemical etching and dry etching such as shot blasting), or by injection-molding the resin part with use of a die having a surface provided with fine asperities for molding the adhesive surface (anchor effect). However, in the former method, a step of forming a masking and a step of removing the same are essential, and in addition, a step of carefully removing fine foreign matters generated in accordance with the etching is necessary, whereby an increase in cost becomes significant. Further, in the latter method, there are problems that it is difficult to smoothly remove the die, and that predetermined asperities can not be obtained due to abrasion of the die. Meanwhile, in the configuration of the present invention in which the UV treatment is performed on the adhesive surface of the resin part, those problems are eliminated, and the adhesive strength with respect to the mating part can be increased stably and at low cost.

Here, a mechanism of improving the adhesive force by the UV treatment is briefly described. First, when a C—H bond on a resin surface is cut by irradiation of an ultraviolet ray, a hydrogen atom (H) of small atomic weight is extracted from the resin surface. Meanwhile, high-energy active oxygen (oxygen molecule) is generated on the resin surface by the ultraviolet ray, and reacts with a remaining C atom to thereby form an oxygen-rich functional group (C=O bond) on the resin surface. The functional group of this type increases its surface energy to enhance hydrophilic property. As a result, the adhesive force that depends on the hydrophilic property is improved. As described above, the UV treatment performs surface modification at molecular level, and hence the asperities are not formed on the surface of the resin part. Therefore, there is no particular problem if the UV treatment is performed on a region other than the adhesive surface.

The resin part may be, for example, a bearing part, and the mechanical part according to the present invention including the resin part is suitable particularly as a component of a fluid dynamic bearing device in which various dimension accuracy is required at high level. In addition, the fluid dynamic bearing device having the above-mentioned configuration of the present invention is suitable as a bearing device for a spindle motor including a stator coil and a rotor magnet.

The mechanical part according to the present invention having the configuration described above can be manufactured as follows, for example. That is, as a first manufacturing method for a mechanical part according to the present invention, which is made for achieving the second object, provided is a manufacturing method for a mechanical part, the mechanical part including two parts fixed to each other by an anaerobic adhesive, at least one of the two parts being made of a resin material, characterized in that, after irradiation of an electromagnetic wave onto an adhesive surface of the resin part, the electromagnetic wave being transmitted through an infrared cut filter having a transmittance of 50% or more and 80% or less in an electromagnetic wave having a wavelength of 254 nm, another part of the two parts is fixed to the resin part with the anaerobic adhesive.

The UV treatment is performed by irradiating, onto a workpiece, the electromagnetic wave having the wavelength in the ultraviolet ray region from a light source such as a high intensity discharge (HID) lamp represented by a metal halide lamp, a low-pressure mercury lamp, and an excimer lamp. Of the various light sources, the HID lamp has a long irradiation distance, and has merit that the degree of freedom for a treatment step can be increased. Accordingly, the HID lamp is frequently used in the UV treatment performed on the mechanical part of this type. However, the HID lamp irradiates a light beam containing not only the electromagnetic wave having the wavelength in the ultraviolet ray region (ultraviolet ray) but also the electromagnetic wave having the wavelength in the infrared ray region (infrared ray). Thus, when the treatment is performed for a long period of time for obtaining a sufficient effect of improving adhesive property, there arises a problem that the surface temperature of the adhesive surface rises and the resin part is heat-deformed. While it is possible to solve such a problem, for example, by providing a predetermined cooling time during the UV treatment, the treatment time is elongated, thereby leading to an increase in cost.

In view of this, as described above, if the electromagnetic wave, which is transmitted through the infrared cut filter having a transmittance of 50% or more and 80% or less in the electromagnetic wave (ultraviolet ray) having the wavelength of 254 nm, is irradiated onto the adhesive surface of the resin part, even when the HID lamp is used as the light source for the UV treatment, the infrared ray is cut by the infrared cut filter. As a result, it is possible to enhance the adhesive property of the adhesive surface while effectively avoiding the problem of the heat deformation of the resin part. Further, if the irradiation is performed as described above, the cooling time for the resin part during the UV treatment is unnecessary, and hence it is possible to shorten the treatment time to thereby reduce cost for the treatment, or possible to obtain a further effect of improving adhesive property by replacing the cooling time by the UV irradiation time. Further, the UV treatment can be performed using the HID lamp, and hence the degree of freedom for the treatment step is high as described above, and the HID lamp is suitable for performing the UV treatment on the mechanical part of this type.

In the following, there is described the reason why the infrared cut filter having a transmittance of 80% or less in the electromagnetic wave having the wavelength of 254 nm is used. Theoretically, it can be said that a transmittance in the electromagnetic wave having the wavelength of 254 nm becomes more preferred as the transmittance becomes closer to 100%. However, a transmittance of the infrared ray becomes high in the infrared cut filter having a transmittance of more than 80% in the electromagnetic wave having the wavelength of 254 nm, and there arises a problem of excessive temperature rise of the resin surface (heat deformation of resin part). In addition, the infrared cut filter, which has a transmittance of more than 80% in the electromagnetic wave having the wavelength of 254 nm and can solve the problem of excessive temperature rise, does not exist due to technical problems.

It is further desirable that the infrared cut filter used in the method have a transmittance of 10% or more and 30% or less in the electromagnetic wave (infrared ray) having the wavelength of 800 nm. In the current technology, in the infrared cut filter having a transmittance of less than 10%, a transmittance in the electromagnetic wave having the wavelength of 254 nm is also decreased, and hence a sufficient modification effect can not be expected. Further, in the infrared cut filter having a transmittance of more than 30%, it is difficult to reliably solve the problem of the heat deformation.

Further, the mechanical part according to the present invention can be also manufactured as follows. That is, as a second manufacturing method for a mechanical part according to the present invention, which is made for achieving the second object, provided is a manufacturing method for a mechanical part, the mechanical part including two parts fixed to each other by an anaerobic adhesive, at least one of the two parts being made of a resin material, characterized in that, onto an adhesive surface of a resin part, after an electromagnetic wave having a wavelength of 254 nm and an electromagnetic wave having a wavelength of 185 nm are irradiated simultaneously and at an accumulated amount of light of each of the electromagnetic waves of 500 $mJ/cm^2$ or more, another part is fixed to the resin part with the anaerobic adhesive.

In this way, as described above, when the electromagnetic wave (ultraviolet ray) having the wavelength of 254 nm is irradiated onto the adhesive surface of the resin part, instead of cutting a C—H bond on the resin surface so as to extract a hydrogen atom (H) of small atomic weight from the resin surface, an oxygen-rich functional group (C=O bond) is generated on the resin surface, and this functional group enhances hydrophilic property. As a result, the adhesive force that depends on the hydrophilic property is improved. At this time, as described above, when the higher-energy electromagnetic wave having the wavelength of 185 nm is simultaneously irradiated, oxygen in the air can be converted into ozone. The ozone generates a larger amount of active oxygen by absorbing the electromagnetic wave having the wavelength of 254 nm, and hence a still larger amount of C=O bonds can be generated on the resin surface. That is, when the electromagnetic wave having the wavelength of 254 nm and the electromagnetic wave having the wavelength of 185 nm are simultaneously irradiated, owing to a synergistic effect, it is possible to obtain a further effect of improving adhesive property. Further, as described above, the electromagnetic waves having both the wavelengths are irradiated so that the accumulated amount of light of each of the electromagnetic waves becomes 500 $mJ/cm^2$ or more, whereby it is possible to reliably obtain an effect of improving adhesive property.

The electromagnetic waves respectively having the wavelength of 254 nm and the wavelength of 185 nm can be simultaneously irradiated with use of the low-pressure mercury lamp. The low-pressure mercury lamp generally includes, as components, a quartz arc tube (also referred to as inner tube) filled with mercury or argon gas and a quartz outer tube covering the inner tube. It is desirable that the inner tube and the outer tube be made of synthetic quartz. The low-pressure mercury lamp including the tubes made of synthetic quartz has a higher transmittance in the electromagnetic wave having the wavelength in the ultraviolet ray region when compared to a lamp including tubes made of so-called general quartz, and it is possible to obtain a strong effect of improving adhesive property.

Note that, the low-pressure mercury lamp has a relatively long irradiation distance. Thus, the low-pressure mercury lamp has an advantage that the degree of freedom for the treatment step is higher when compared to an excimer lamp having an irradiation distance of a few mm.

The above-mentioned configuration according to the present invention is suitable when any kinds of resin materials are used as the base resin forming the resin part. However, the above-mentioned configuration is particularly suitable when the base resin of the mechanical part is aromatic polyester such as liquid crystal polymer (LCP). In general, the aromatic polyester such as liquid crystal polymer is unlikely to be subjected to the surface modification by the UV treatment, and necessary to be subjected to the treatment for a long period of time.

Effects of the Invention

As described above, according to the present invention, in a mechanical part including two parts fixed to each other by an anaerobic adhesive, at least one of the two parts being made of a resin material, an adhesive strength between the two parts is sufficiently increased, and reliability thereof can be improved. Further, in the above-mentioned method according to the present invention, the adhesive strength between the two parts can be increased at low cost.

BEST MODE FOR CARRYING OUT THE INVENTION

In the following, an embodiment of the present invention is described with reference to the drawings.

FIG. 1 conceptually illustrates a configuration example of a spindle motor for information equipment. The spindle motor is used for a disk drive such as an HDD and includes a fluid dynamic bearing device 1 that rotatably supports a shaft member 2, a disk hub 3 fixed onto the shaft member 2, and a stator coil 4 and a rotor magnet 5 which are opposed to each other via, for example, a gap in a radial direction. The stator coil 4 is attached to an outer periphery of a bracket 6 and the rotor magnet 5 is attached to an inner periphery of the disk hub 3. A housing 7 of the fluid dynamic bearing device 1 is fixed to an inner periphery of the bracket 6. One or a plurality of (two in the figure) disks D such as magnetic disks are held in the disk hub 3. When the stator coil 4 is energized, the rotor magnet 5 is rotated by electromagnetic force between the stator coil 4 and the rotor magnet 5. According to the rotation, the disk hub 3 and the shaft member 2 integrally rotate.

FIG. 2 is an enlarged view of the fluid dynamic bearing device 1 illustrated in FIG. 1. The fluid dynamic bearing device 1 illustrated in the figure includes, as main components, the housing 7 having an opening at one end thereof, a bearing sleeve 8 fixed to an inner periphery of the housing 7, the shaft member 2 having a shaft portion 2a inserted along an inner periphery of the bearing sleeve 8, and a seal member 9 for sealing the opening of the housing 7, and lubricating oil serving as lubricating fluid is filled in an interior space of the housing 7. Note that, in the following description, for convenience of description, it is assumed that the opening side of the housing 7 is an upper side and the opposite side in an axial direction of the upper side is a lower side.

The shaft member 2 is made of a metal material such as stainless steel and includes the shaft portion 2a and a flange portion 2b integrally or separately provided at a lower end of the shaft portion 2a.

The bearing sleeve 8 is formed into a cylindrical shape by, for example, a porous body made of sintered metal, in particular, a porous body made of sintered metal containing copper as a main component. In an inner peripheral surface 8a, upper and lower two cylindrical regions constituting radial bearing surfaces of a first radial bearing portion R1 and a second radial bearing portion R2 are provided apart from each other in the axial direction. In the two cylindrical regions, there are provided radial dynamic pressure generating portions in which a plurality of dynamic pressure grooves are arrayed in, for example, a herringbone shape (illustration is omitted). Further, an annular region constituting a thrust bearing surface of a first thrust bearing portion T1 is provided on a lower end surface 8b of the bearing sleeve 8. In the annular region, there is provided a thrust dynamic pressure generating portion in which a plurality of dynamic pressure grooves are arrayed in, for example, a spiral shape (illustration is omitted).

The housing 7 is made of a resin material, and in this embodiment, liquid crystal polymer (LCP) is used as a base resin of the resin material. Further, the housing 7 is an injection-molded article formed into a bottomed cylinder shape, and integrally has a side portion 7a and a bottom portion 7b sealing a lower end opening of the side portion 7a. On an inner bottom surface 7b1 of the bottom portion 7b, there is provided an annular region constituting a thrust bearing surface of a second thrust bearing portion T2. In the annular region, though illustration is omitted, there is provided a thrust dynamic pressure generating portion in which a plurality of dynamic pressure grooves are arrayed in, for example, a spiral shape.

The seal member 9 is made of, for example, a soft metal material such as brass or other metal materials or a resin material, formed into a ring shape, and fixed to the inner periphery of the opening of the housing 7. An inner peripheral surface 9a of the seal member 9 is opposed to a tapered surface 2a2 provided on an outer peripheral surface 2a1 of the shaft portion 2a through an intermediation of a predetermined seal space S1.

In the fluid dynamic bearing device 1 having the configuration described above, when the shaft member 2 rotates, the upper and lower two regions constituting the radial bearing surfaces of the inner peripheral surface 8a of the bearing sleeve 8 are opposed to the outer peripheral surface 2a1 of the shaft portion 2a through an intermediation of radial bearing gaps. Then, in accordance with the rotation of the shaft member 2, oil film rigidity of an oil film formed in the respective radial bearing gaps is increased by a dynamic pressure action of the dynamic pressure grooves formed in the radial bearing surfaces, respectively. The shaft member 2 is rotatably non-contact supported in a radial direction by this pressure. Consequently, the first radial bearing portion R1 and the second radial bearing portion R2 that rotatably non-contact support the shaft member 2 in the radial direction are formed.

Further, when the shaft member 2 rotates, the region constituting the thrust bearing surface of the lower end surface 8b of the bearing sleeve 8 is opposed to an upper end surface 2b1 of the flange portion 2b through an intermediation of a thrust bearing gap, and the region constituting the thrust bearing surface of the inner bottom surface 7c1 of the housing 7 is opposed to a lower end surface 2b2 of the flange portion 2b through an intermediation of a thrust bearing gap. Then, in accordance with the rotation of the shaft member 2, oil film rigidity of an oil film formed in the respective thrust bearing gaps is increased by a dynamic pressure action of the dynamic pressure grooves formed in the thrust bearing surfaces, respectively. The shaft member 2 is rotatably non-contact supported in both thrust directions by this pressure. Consequently, the first thrust bearing portion T1 and the second thrust bearing portion T2 that rotatably non-contact support the shaft member 2 in both the thrust directions are formed.

Further, during the rotation of the shaft member 2, as described above, because the seal space S1 assumes a taper shape gradually narrowing toward an inner side of the housing 7, lubricating oil in the seal space S1 is drawn in a direction of narrowing of the seal space, i.e., toward the inner side of the housing 7 by a drawing action by capillary force. Consequently, leakage of the lubricating oil from the inside of the housing 7 is effectively prevented. Further, the seal space S1 has a buffer function for absorbing a volume change amount involved in a temperature change of the lubricating oil filled in the interior space of the housing 7. In a range of an assumed temperature change, an oil surface of the lubricating oil is always present in the seal space S1.

In the fluid dynamic bearing device 1 having the configuration described above, a part of or entire region of an outer peripheral surface 7a1 of the housing 7 (in this embodiment, a part of painted region in the figure) constitutes an adhesive surface 10 with respect to the bracket 6. After UV treatment is performed at least on the adhesive surface 10, the housing 7 is fixed with use of an anaerobic adhesive to the inner periphery of the bracket 6 made of, for example, an aluminum alloy. That is, in this embodiment, "a mechanical part" of the present invention is constituted by the housing 7 (fluid dynamic bearing device 1) and the bracket 6, and "a resin part" is constituted by the housing 7 made of a resin. An adhesive strength per unit area of the housing 7 with respect to the bracket 6 is set to 8 N/mm$^2$ or more.

Next, regarding a method of adhesively fixing the housing 7 of the fluid dynamic bearing device 1 to the inner periphery of the bracket 6 with the above-mentioned adhesive strength, a step of performing the UV treatment on the adhesive surface 10 of the housing 7 is mainly described.

FIG. 3 illustrates a step of performing the UV treatment on the adhesive surface 10 of the housing 7. A treatment device illustrated in the figure includes, as main components, a supporting portion 13 that rotatably supports the housing 7, a light source 11 disposed apart from the outer peripheral surface 7a1 (adhesive surface 10) of the housing 7 by a predetermined amount, and a filter 12 interposed between the light source 11 and the housing 7. The light source 11 can irradiate a light beam including at least the electromagnetic wave having the wavelength of 254 nm and the electromagnetic wave having the wavelength of 800 nm. Specifically, a metal halide lamp, which is a kind of the HID lamp, is used.

The filter 12 is an infrared cut filter having a transmittance of 50% or more and 80% or less in the electromagnetic wave having the wavelength of 254 nm. The filter 12 used in this embodiment further has a transmittance of 10% or more and 30% or less in the electromagnetic wave having the wavelength of 800 nm. The filter is not particularly limited as long as it satisfies the above-mentioned transmittance condition. For example, there can be used a filter which is obtained by laminating oxide-based films on glass, quartz, synthetic quartz, or the like, and designed so as to cut or transmit specific electromagnetic wave, and a so-called colored glass which is obtained by compounding, at an appropriate ratio, aluminum oxide, barium oxide, zinc oxide, magnesia oxide, cobalt oxide, nickel oxide, or the like into phosphoric acid. U330 manufactured by HOYA CORPORATION can be given as a commercial example of the colored glass that satisfies the above-mentioned transmittance condition.

In the treatment device having the configuration described above, when the light beam is irradiated from the light source 11 so that the light beam (electromagnetic wave) transmitted through the filter 12 is irradiated onto the adhesive surface 10 of the housing 7, the electromagnetic wave having the wavelength of 800 nm contained in the light beam, that is, an infrared ray is appropriately cut by the filter 12, and hence a problem of excessive temperature rise of the adhesive surface 10 and thus that of heat deformation of the housing 7 are effectively solved. Meanwhile, the electromagnetic wave having the wavelength of 254 nm contained in the light beam is transmitted through the filter 12 to reach the adhesive surface 10 of the housing 7. Further, of the adhesive surface 10, on the surface of the circumferential region that the electromagnetic wave having the wavelength of 254 nm, that is, an ultraviolet ray reaches, instead of cutting a C—H bond on the surface of the circumferential region so as to extract a hydrogen atom (H) of small atomic weight, high-energy active oxygen (oxygen molecule) is generated, and reacts with a remaining C atom to thereby generate an oxygen-rich functional group (C=O bond). In this embodiment, after the above-mentioned treatment is appropriately performed on one part of the circumferential region of the adhesive surface 10, the supporting portion 13 is rotated and driven, and the same treatment is performed on the other part of the circumferential region of the adhesive surface 10, whereby the UV treatment is performed on the entire surface of the adhesive surface 10. Further, the functional group formed on the adhesive surface 10 increases its surface energy to enhance hydrophilic property. As a result, it is possible to improve the adhesive strength (adhesive force) that depends on the hydrophilic property.

Note that, in this embodiment, after the UV treatment is performed on one part of the circumferential region of the adhesive surface 10 with use of the single light source 11 and the single filter 12, the housing 7 is rotated and driven by the supporting portion 13, whereby the UV treatment is performed on the entire surface of the adhesive surface 10. However, multiple light sources 11 and multiple filters 12 are placed in the circumferential direction of the housing 7, and the UV treatment may be simultaneously performed on the entire surface of the adhesive surface 10 (illustration is omitted). Further, in the above description, the UV treatment is performed on the adhesive surface 10 of the housing 7 in a single part state. However, the UV treatment may be performed on the adhesive surface 10 of the housing 7 to which other members (for example, bearing sleeve 8) are assembled, or the UV treatment may be performed on the adhesive surface 10 of the housing 7 constituting the fluid dynamic bearing device 1 in a finished-product state. That is, as long as the UV treatment can be performed on the entire adhesive surface 10 of the housing 7 with use of the light source 11 and the filter 12 having the above-mentioned configuration, the process of the UV treatment can be arbitrarily set.

The anaerobic adhesive is applied to the adhesive surface 10 of the housing 7 subjected to the UV treatment as described above, or the inner peripheral surface of the bracket 6 opposed thereto, and the housing 7 of the fluid dynamic bearing device 1 is adhesively fixed to the inner periphery of the bracket 6. When the anaerobic adhesive is completely cured, the adhesive strength per unit area of the housing 7 with respect to the bracket 6 is set to 8 N/mm$^2$ (8 Mpa) or more. Note that, prior to application of the adhesive, a primer may be applied to the adhesive surface 10 of the housing 7 or the inner peripheral surface of the bracket 6.

As described above, in the present invention, the adhesive strength per unit area between the housing 7 and the bracket 6 which are adhesively fixed to each other by the anaerobic adhesive is set to 8 N/mm² or more. This adhesive strength is the same or larger when compared to the adhesive strength in a case of adhesively fixing the both parts to each other by a general thermosetting adhesive. When adhesively fixing the both parts to each other by the thermosetting adhesive, there are problems that heat treatment for curing is necessary and manufacturing cost is easily increased, and that it is difficult to fix the both parts to each other with accuracy within a required level due to a relatively large shrinkage ratio. However, according to the configuration of the present invention in which the both parts are adhesively fixed to each other by the anaerobic adhesive, it is unnecessary to take the problems described above into consideration. In addition, it is possible to secure the adhesive strength necessarily sufficient for the both parts, and hence reliability of the fluid dynamic bearing device and thus the spindle motor is improved.

Further, in the present invention, the above-mentioned adhesive strength is obtained by performing the UV treatment on the adhesive surface 10 of the housing 7 made of a resin material. Thus, for example, there are solved a fear that cost is increased in the case where the above-mentioned adhesive strength is obtained by roughing the adhesive surface 10 by an etching, or a fear that quality is lowered in the case where the above-mentioned adhesive strength is obtained by injection-molding the housing 7 with use of a die having a surface provided with fine asperities for molding the adhesive surface 10, whereby the adhesive strength between the both parts can be increased stably and at low cost.

In particular, in view of the characteristics required to have the rotation accuracy of micro order, the configuration according to the present invention is suitable for the fluid dynamic bearing device 1 described above and thus the spindle motor.

The method of securing the adhesive strength of 8 N/mm² or more between the resin housing 7 and the aluminum alloy bracket 6, which are adhesively fixed to each other by the anaerobic adhesive, is not limited thereto. Even in the case where, in the following mode, the UV treatment is performed on the adhesive surface 10 of the housing 7 and then the adhesive surface 10 of the housing 7 is adhesively fixed to the inner periphery of the bracket 6 by the anaerobic adhesive, it is possible to secure the same adhesive strength. However, in the following description, a different process, that is, only a UV treatment step is described, and description of the other steps is omitted.

In a second manufacturing method according to the present invention, the light source 11, which is the metal halide lamp in the above-mentioned embodiment, is replaced by a low-pressure mercury lamp, and the filter 12 is omitted (illustration is omitted). The low-pressure mercury lamp serving as the light source 11 can simultaneously irradiate the electromagnetic wave having the wavelength of 254 nm and the electromagnetic wave having the wavelength of 185 nm, and the low-pressure mercury lamp in which an inner tube and an outer tube are made of synthetic quartz (synthetic quartz glass) is used. Note that, the synthetic quartz is generated by melting silica ($SiO_2$) which is chemically synthesized, and has the higher purity and the higher transmittance in the electromagnetic wave having the shorter wavelength (electromagnetic wave having wavelength in ultraviolet ray region) when compared to so-called general quartz which is generated by melting natural crystal. Therefore, the synthetic quartz is suitable as a material for forming the tubes constituting the low-pressure mercury lamp used in the UV treatment.

In the treatment device having the configuration described above, the light beam is irradiated from the low-pressure mercury lamp serving as the light source 11 onto the adhesive surface 10 of the housing 7. The light beam is irradiated so that both of an accumulated amount of light of the electromagnetic wave having the wavelength of 254 nm and an accumulated amount of light of the electromagnetic wave having the wavelength of 185 nm become 500 mJ/cm² or more. Further, of the adhesive surface 10, in the circumferential region to which the light beam is irradiated, instead of cutting a C—H bond so as to extract a hydrogen atom (H) of small atomic weight, high-energy active oxygen (oxygen molecule) is generated owing to the electromagnetic wave, and reacts with a remaining C atom to thereby generate an oxygen-rich functional group (C=O bond). At this time, owing to the simultaneously irradiated electromagnetic wave having the wavelength of 185 nm, oxygen in the air is converted into ozone. The ozone generates a larger amount of active oxygen by absorbing the electromagnetic wave having the wavelength of 254 nm, and hence a still larger amount of C=O bonds are generated on the adhesive surface 10.

Each of the C=O bonds generated on the adhesive surface 10 increases its surface energy to enhance hydrophilic property. As a result, it is possible to improve the adhesive strength (adhesive force) that depends on the hydrophilic property. In particular, as in this embodiment, when the electromagnetic wave having the wavelength of 254 nm and the electromagnetic wave having the wavelength of 185 nm are simultaneously irradiated, owing to a synergistic effect, it is possible to obtain a further effect of improving adhesive property. Further, as described above, the electromagnetic waves having both the wavelengths are irradiated so that the accumulated amount of light of each of the electromagnetic waves becomes 500 mJ/cm² or more, whereby it is possible to reliably obtain an effect of improving adhesive property.

Even in the case where the UV treatment is performed as described above, after the UV treatment is performed on one part of the circumferential region of the adhesive surface 10 with use of the single light source 11, the housing 7 is rotated and driven by the supporting portion 13, whereby the UV treatment may be performed on the entire surface of the adhesive surface 10. Alternatively, multiple light sources 11 are placed in the circumferential direction of the housing 7, and the UV treatment may be simultaneously performed on the entire surface of the adhesive surface 10. Further, the UV treatment may be performed on the adhesive surface 10 of the housing 7 in a single part state, or the UV treatment may be performed on the adhesive surface 10 of the housing 7 to which other members (for example, bearing sleeve 8) are assembled, or performed on the adhesive surface 10 of the housing 7 constituting the fluid dynamic bearing device 1 in a finished-product state.

In the above description, the present invention is applied to the case where the housing 7 made of liquid crystal polymer is fixed to the aluminum alloy bracket 6 by the anaerobic adhesive. However, the present invention is also suitable in the case where the housing 7 is made of other thermoplastic resin, for example, crystalline resin such as polyetheretherketone (PEEK), polybutylene terephthalate (PBT), polyphenylene sulfide (PPS), and polyamide (PA), or non-crystalline resin such as polysulfone (PSU), polyethersulfone (PES), polyphenylsulfone (PPSU), and polyetherimide (PEI). Further, the above-mentioned resin materials are merely examples, and the present invention is suitable even in the case where the housing 7 is made of other resin, for example, a thermosetting resin such as phenol, epoxy, unsaturated polyester, and vinyl ester. Further, the resin materials may be mixed with fillers that give various characteristics to the base resin. As the fillers, there can be used, for example, fiber filler such as glass fiber, whisker filler such as potassium titanate, scale-like filler such as mica, conductive fiber or powder fillers such as carbon fiber, carbon black, graphite, carbon nano material, and metal powder. Those fillers can be used independently or in a mixed state of two or more kinds of fillers.

Further, even in the case where the housing 7 is made of metal whereas the bracket 6 is made of a resin, or the case where the housing 7 and the bracket 6 are made of a resin, the configuration of the present invention described above can be suitably adopted.

Further, in the above description, while there is described the case where the present invention is applied to the mechanical part (bearing part) constituting the spindle motor, the present invention is not limited thereto. As a matter of course, the present invention can be also applied to other mechanical part constituting a drive mechanism or a power transmission mechanism, for example, a mechanical part constituting a clutch.

EXAMPLE 1

In order to substantiate the effectiveness of the first manufacturing method according to the present invention, with use of a first test piece of a columnar shape corresponding to the resin housing 7 and a second test piece of a cylindrical shape corresponding to the aluminum alloy bracket 6, the UV treatment was performed on the adhesive surface of the first test piece by Treatment Method 1 to Treatment Method 4 described below, and then a confirmatory test was conducted about the adhesive strength between both the test pieces in the case of fixing the first test piece to the second test piece by the anaerobic adhesive. The adhesive strength was confirmed while following procedures (1) to (4) described below.

(1) An adhesive surface of the first test piece 101, which is subjected to the UV treatment in the following mode, is applied with the anaerobic adhesive, and fixed to an inner periphery of the second test piece 102 to manufacture an assembly.

(2) After the manufactured assembly is left as it is for an hour and the anaerobic adhesive is completely cured, the assembly is placed onto a support base 103 of a test device illustrated in FIG. 4.

(3) Of the assembly supported by the support base 103, the first test piece 101 is pressurized by a pressurizing member 104, and pressure force generated when the first test piece 101 is detached from the inner periphery of the second test piece 102 is measured.

(4) The above-mentioned pressure force is divided by the adhesive area between both the test pieces 101, 102 to calculate the adhesive strength per unit area (=N/mm$^2$).

Note that, in this example, as the material for forming the first test piece 101, VectraS135 manufactured by Polyplastics Co., Ltd. (liquid crystal polymer containing glass fiber of 35 wt %) was used. The dimension of the first test piece 101 is outer diameter 9.5 mm×total length 20 mm, and the length of the adhesive surface of the first test piece 101 with respect to the second test piece 102 was set to 10 mm. Further, in this example, as the anaerobic adhesive used for adhesively fixing the test pieces 101, 102 to each other, AS5851 manufactured by ASEC Co., Ltd. was used.

Treatment Methods 1 to 4 are described in the following items (a) to (d) (regarding physical property data of filter used in each method and transmittance date in various wavelengths, see FIG. 5). In any one of the methods, the UV treatment was performed on the adhesive surface of the first test piece 101 with use of a metal halide lamp having an illumination of 150 mW/cm$^2$ which is placed apart from the adhesive surface of the first test piece 101 by 180 mm. However, the material for forming the first test piece 101 used in this example is heat-deformed at about 120° C., and hence the UV treatment time in each Treatment Method was set such that the surface temperature of the adhesive surface does not exceed 110° C. during the UV treatment. When this time was set, a relation between the surface temperature of the adhesive surface and the UV treatment time was examined, and hence the results of the examination are illustrated in FIG. 6.

(a) Treatment Method 1 (Example 1)
Filter: U330 manufactured by HOYA CORPORATION (thickness: 3 mm)
UV treatment time: 80 sec
Maximum surface temperature during the treatment: 105° C.

(b) Treatment Method 2 (Example 2)
Filter: U330 manufactured by HOYA CORPORATION (thickness: 3 mm)
UV treatment time: 50 sec
Maximum surface temperature during the treatment: 89° C.

(c) Treatment Method 3 (Comparative Example 1)
Filter: none
UV treatment time: 25 sec
Maximum surface temperature during the treatment: 110° C.

(d) Treatment Method 4 (Comparative Example 2)
Filter: HA50 manufactured by HOYA CORPORATION (thickness: 3 mm)
UV treatment time: 100 sec
Maximum surface temperature during the treatment: 104° C.

The adhesive strength between both the test pieces 101, 102, which was confirmed in each of the above-mentioned methods on a condition that the number of samples N=5, is illustrated In FIG. 7. As is apparent from the figure, the adhesive strength between both the test pieces 101, 102 is an average value of N=5, and the results of the average value satisfied the following expression: Example 1>Example 2>Comparative Example 2>Comparative Example 1.

First, in the method of Comparative Example 1 (Treatment Method 3) in which the UV treatment was performed without using the filter, due to the temperature rise involved in the UV treatment, surface modification enough to obtain the sufficient effect of improving adhesive property was not achieved. Thus, it is considered that the necessarily sufficient adhesive strength between both the test pieces could not be obtained, and that the adhesive strength became lowest in all of Treatment Methods. Further, the filter used in the method of Comparative Example 2 (Treatment Method 4) is a general infrared cut filter, and this filter, as is apparent from the physical property data of FIG. 5, cuts not only the infrared ray but also the ultraviolet ray which contributes to the improvement of adhesive strength (surface modification). Thus, it is considered that, though the UV treatment time was longest in all of Treatment Methods, the necessarily sufficient adhesive strength between both the test pieces could not be obtained. Further, in the methods of Comparative Examples 1 and 2, dispersion of the adhesive strength among samples is relatively large. Therefore, it is difficult to obtain the stable adhesive strength, and it is hard to say that the methods of Comparative Examples 1 and 2 are preferred as means for increasing reliability of the mechanical part of this type.

Meanwhile, in Example 1 (Treatment Method 1), the average value of N=5 became 19.4 N/mm$^2$, and it was possible to obtain the much higher adhesive strength when compared to the adhesive strength (about 8 N/mm$^2$) in the case of using the thermosetting adhesive. Further, as is apparent from FIG. 6, in Treatment Method 1, the surface temperature of the adhesive surface at the time of completion of the UV treatment is approximately 105° C., and hence there is no problem of heat deformation involved in the UV treatment. In the method of Example 2 (Treatment Method 2), the adhesive strength between both the test pieces was inferior to that in Treatment Method 1 because the UV treatment time was shorter than that in Treatment Method 1. However, the average value of N=5 became 9.7 N/mm$^2$, and it was possible to obtain the higher adhesive strength when compared to that in the case of using the thermosetting adhesive. Further, in the case of adopting the methods according to the present invention, dispersion of the adhesive strength among the samples is relatively small. Therefore, the methods according to the present invention are suitable as means for obtaining the stable adhesive strength, in addition, as means for increasing reliability of the mechanical part of this type.

Besides, in order to confirm the surface modification state of the adhesive surface of the first test piece 101 achieved by the UV treatment, that is, the amount of the C═O bonds, the test piece subjected to the UV treatment by the methods of Example 1 and Comparative Example 2 and the test piece not subjected to the UV treatment were subjected to an XPS (C1s spectra) analysis. Thus, the results of the analysis are illustrated in FIG. 8. Note that, as illustrated in FIG. 8, the bond energy of the C═O bond is 287 eV, and hence the values on the ordinate axis at this point are compared and verified.

As is apparent from the figure, in the test piece subjected to the UV treatment by the method of Example 1, the C═O bond was observed. Meanwhile, in the test piece subjected to the UV treatment by the method of Comparative Example 2 and the test piece not subjected to the UV treatment, the C═O bond was not observed. Note that, it seems that the reason why the C═O bond was not observed in the one subjected to the UV treatment by the method of Comparative Example 2 is that the filter used in the method cut not only the infrared ray but also the ultraviolet ray.

The effectiveness of the first manufacturing method according to the present invention can be substantiated from the test results described above.

EXAMPLE 2

Next, in order to substantiate the effectiveness of a second manufacturing method according to the present invention, with use of the test pieces and the test device same as those used in Example 1, a confirmatory test was conducted about the adhesive strength (=N/mm$^2$) between both the test pieces. Note that, on the adhesive surface of the first test piece 101, the UV treatment was performed with use of a low-pressure mercury lamp including a synthetic quartz tube, which is placed apart from the adhesive surface by 10 mm. The low-pressure mercury lamp can irradiate the electromagnetic wave having the wavelength of 254 nm at an illumination of 18 mW/cm$^2$ and the electromagnetic wave having the wavelength of 185 nm at an illumination of 14 mW/cm$^2$. The UV treatment conditions and the test results in the confirmatory test are illustrated in FIG. 9.

As is apparent from the test results of FIG. 9, in Comparative Example 3 in which the UV treatment was not performed, the average value became 2.9 N/mm$^2$, and it was impossible to obtain the sufficient adhesive strength (8 N/mm$^2$) between both the test pieces. Further, though the UV treatment was performed in Comparative Example 4, the accumulated amount of light of each of the electromagnetic waves respectively having the wavelengths of 185 nm and 254 nm was 500 mJ/cm$^2$ or less, and hence it was impossible to obtain the sufficient adhesive strength between both the test pieces. In contrast, in Examples 3 to 5 in which the UV treatment was performed so as to conform to the second manufacturing method according to the present invention, the average values of the adhesive strength of N=5 became 11.7 N/mm$^2$, 17.0 N/mm$^2$, 17.6 N/mm$^2$, respectively, and it was possible to obtain the necessarily sufficient adhesive strength between both the test pieces. Note that, as is apparent from the test results, the adhesive strength is increased in accordance with an increase in accumulated amount of light. Therefore, it is found that, in view of reliably obtaining the required adhesive strength, adjustment of the accumulated amount of light is useful.

BRIEF DESCRIPTION OF THE DRAWINGS

FIG. 5 A table showing physical property data of filters used in a first confirmatory test.

FIG. 6 A graph illustrating a relation between a surface temperature of an adhesive surface and a UV treatment time in the first confirmatory test.

DESCRIPTION OF SYMBOLS

Figure 1:
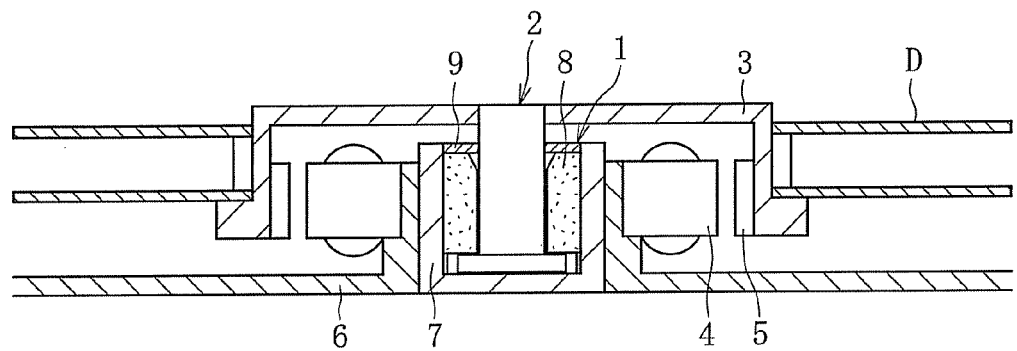
FIG. 1 A sectional view conceptually illustrating a configuration example of a spindle motor for information equipment.
Figure 2:
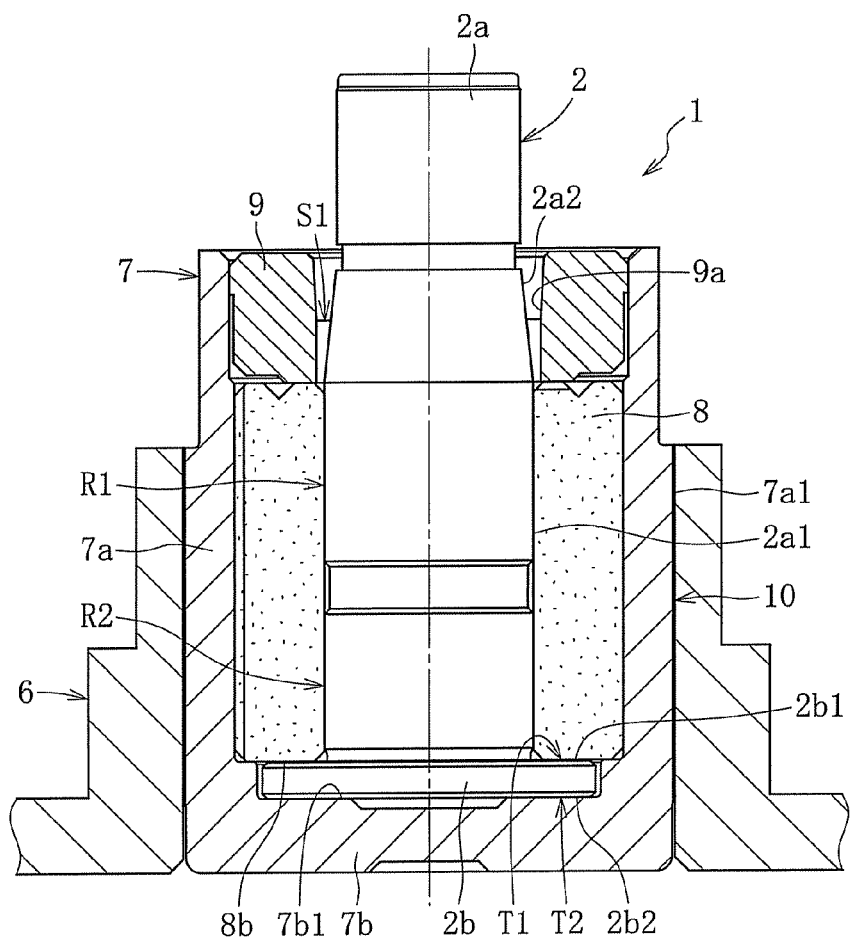
FIG. 2 A sectional view illustrating an example of a fluid dynamic bearing device incorporated in the spindle motor illustrated in FIG. 1.
Figure 3:
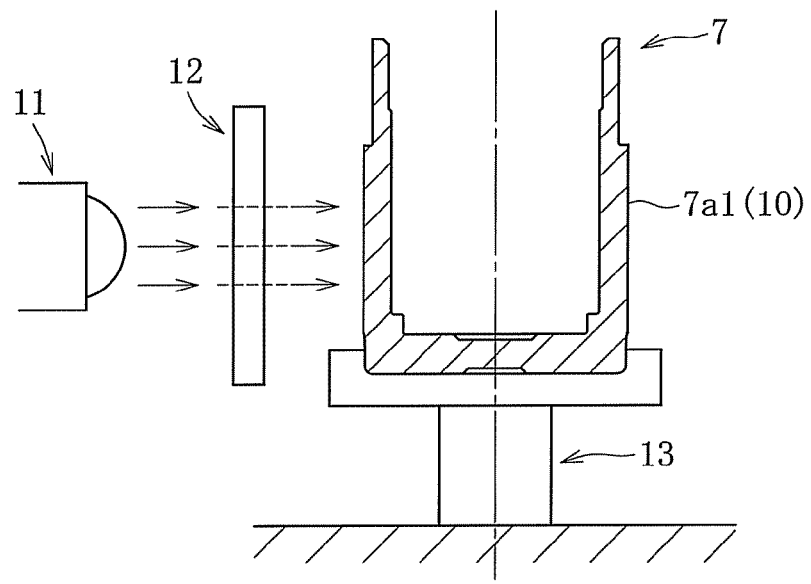
FIG. 3 A view conceptually illustrating a UV treatment step.
Figure 4:
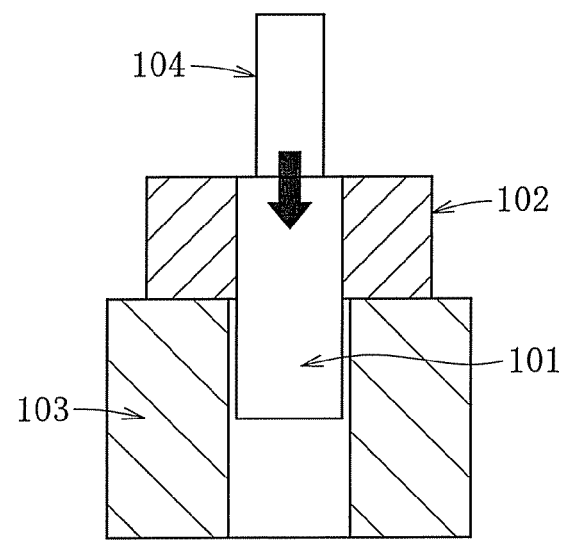
FIG. 4 A sectional view conceptually illustrating a test device used in a confirmatory test for substantiating the effectiveness of the present invention.
Figures 7, 8, 9:
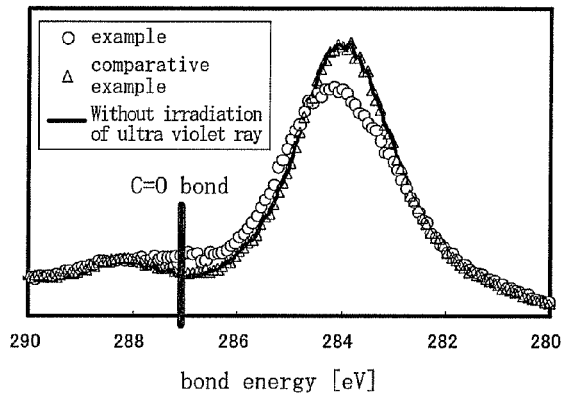
FIG. 7 A table showing test results of the first confirmatory test.
FIG. 8 A graph illustrating a result of an XPS analysis performed in the confirmatory test.
FIG. 9 A table showing test results of a second confirmatory test.

1 fluid dynamic bearing device
2 shaft member
6 bracket (mechanical part)
7 housing (mechanical part)
10 adhesive surface
11 light source
12 filter (infrared cut filter)

The invention claimed is:

1. A manufacturing method for a mechanical part, the mechanical part comprising two parts fixed to each other by an anaerobic adhesive, at least one of the two parts being made of a resin material, characterized in that, after irradiation of an electromagnetic wave onto an adhesive surface of the resin part, the electromagnetic wave being transmitted through an infrared cut filter having a transmittance of 50% or more and 80% or less in an electromagnetic wave having a wavelength of 254 nm and a transmittance of 10% or more and 30% or less in an electromagnetic wave having a wavelength of 800 nm, another part of the two parts is fixed to the resin part with the anaerobic adhesive.

2. A manufacturing method for a mechanical part according to claim 1, wherein a base resin forming the resin part is an aromatic polyester.

3. A manufacturing method for a mechanical part according to claim 1, using a HID lamp for irradiating the electromagnetic wave onto the adhesive surface.

4. A manufacturing method for a mechanical part according to claim 1, wherein the resin part is a bearing part.

* * * * *